(12) United States Patent
Ali et al.

(10) Patent No.: US 8,570,359 B2
(45) Date of Patent: Oct. 29, 2013

(54) VIDEO REGION OF INTEREST FEATURES

(75) Inventors: Walid Ali, Sammamish, WA (US); Ronald Boskovic, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1237 days.

(21) Appl. No.: 12/185,492

(22) Filed: Aug. 4, 2008

(65) Prior Publication Data

US 2010/0026781 A1 Feb. 4, 2010

(51) Int. Cl.
*H04N 7/14* (2006.01)
(52) U.S. Cl.
USPC .................. 348/14.12; 348/14.13; 348/14.14; 348/14.15; 348/14.16
(58) Field of Classification Search
USPC ......... 348/14.01, 14.1, 14.12–14.16; 382/165
See application file for complete search history.

(56) References Cited

U.S. PATENT DOCUMENTS

| | | | | |
|---|---|---|---|---|
| 5,150,432 | A | 9/1992 | Ueno | 382/56 |
| 5,764,803 | A | 6/1998 | Jacquin | 382/236 |
| 5,852,669 | A | 12/1998 | Eleftheriadis | 382/118 |
| 5,907,361 | A * | 5/1999 | Okada | 375/240.08 |
| 6,148,092 | A * | 11/2000 | Qian | 382/118 |
| 6,173,069 | B1 | 1/2001 | Daly | 382/118 |
| 6,256,423 | B1 * | 7/2001 | Krishnamurthy et al. | 382/251 |
| 6,272,253 | B1 | 8/2001 | Bannon | 382/236 |
| 6,275,614 | B1 * | 8/2001 | Krishnamurthy et al. | 382/224 |
| 6,404,900 | B1 | 6/2002 | Qian | 382/103 |
| 6,490,319 | B1 | 12/2002 | Yang | 375/240.03 |
| 6,763,068 | B2 | 7/2004 | Oktem | 375/240.03 |
| 6,917,719 | B2 | 7/2005 | Krishnamurthy et al. | 382/282 |
| 7,778,483 | B2 * | 8/2010 | Messina et al. | 382/274 |
| 8,019,170 | B2 * | 9/2011 | Wang et al. | 382/239 |
| 8,194,978 | B2 * | 6/2012 | Ozdemir et al. | 382/167 |
| 2006/0215766 | A1 * | 9/2006 | Wang et al. | 375/240.24 |
| 2008/0225944 | A1 * | 9/2008 | Pore et al. | 375/240.03 |

OTHER PUBLICATIONS

Hota et al.; "Face Detection by using Skin Color Model based on One Class Classifier"; 2006; IEEE; 9th International Conference on Information Technology (ICIT'06), pp. 15-16.*

Yamada et al., "Skin Color Segmentation Using Coarse-to-Fine Region on Normalized RGB Chromaticity Diagram for Face Detection", Oct. 2008, Journal IEICE—Transactions on Information and Systems archive, vol. E91-D Issue 10, pp. 2493-2502.*

Mohamed, A.S.S.; Ying Weng; Ipson, S.S.; Jianmin Jiang; , "Face detection based on skin color in image by neural networks," Intelligent and Advanced Systems, 2007, ICIAS 2007. International Conference on Print, pp. 779-783.*

(Continued)

*Primary Examiner* — Curtis Kuntz
*Assistant Examiner* — Ryan Robinson
(74) *Attorney, Agent, or Firm* — Merchant & Gould (57) ABSTRACT

Embodiments are configured to provide video conferencing functionality including using region of interest (ROI) features to provide a video signal, but the embodiments are not so limited. In an embodiment, components of a video conferencing system can operate to provide a video signal using pixel data associated with a ROI. In one embodiment, a video conference device can include a detector that can be used to detect human flesh tone regions in a video scene as part of providing a video stream to one or more conference participants.

20 Claims, 7 Drawing Sheets

(56) References Cited

OTHER PUBLICATIONS

Vieux, William E., et al., "Face-Tracking and Coding for Video Compression," http://www-prima.inrialpes.fr/Prima/Homepages/jlc/papers/icvs99-Schwerdt.pdf, University of Oklahoma and Project PRIMA, Aug. 19, 2004, pp. 1-11.

Doulamis, Nikolaos, et al., "Low Bit-Rate Coding of Image Sequences Using Adaptive Regions of Interest," http://ieeexplore.ieee.org/ie14/76/15904/00736718.pdf?temp=x&htry=1, IEEE Transactions on Circuits and Systems for Video Technology, vol. 8, No. 8, Dec. 1998, pp. 928-934.

Wen, Zhen, et al., "Low Bit-Rate Video Streaming for Face-To-Face Teleconference," http://research.microsoft.com/~cohen/icme04.pdf, University of Illinois and University of Washington, Jul. 2004, pp. 1-4.

\* cited by examiner

| N1 | N2 | N3 | N4 |
|----|----|----|----|
| N5 | B1 | B2 | N6 |
| N7 | B3 | B4 | N8 |
| N9 | N10 | N11 | N12 |

VIDEO REGION OF INTEREST FEATURES

BACKGROUND

Video conferencing technology can be used to provide audio and video features to communication parties. For example, business associates can use a video conferencing system to host strategic meetings. Video conferencing systems can be used to enable interactions between two people in distant rooms (point-to-point) or more than one person in a number of rooms at several sites (multi-point). Encoding and decoding techniques are used to improve a user experience when using a video conferencing system. For example, codecs can be designed to encode and decode a captured data stream or signal. Additionally, rate distortion optimizations can be used to control bit allocation operations as part of distributing a given bandwidth budget. For example, rate distortion optimizations can be used to distribute a bandwidth budget across a picture sequence, group of pictures (GOP), picture frames or fields, picture slices (e.g., portions of a picture), and/or macro blocks (MB) (e.g., a 16×16 sets of pixels).

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are configured to provide video conferencing functionality including using region of interest (ROI) features to provide a video signal, but the embodiments are not so limited. In an embodiment, components of a video conferencing system can operate to provide a video signal using pixel data associated with a ROI. In one embodiment, a video conference device can include a detector that can be used to detect human flesh tone and/or other detection regions of a video scene as part of providing a video stream to one or more conference participants.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Various embodiments can be configured to provide a video stream to one or more communication participants, but are not so limited. In an embodiment, components of a video conferencing system can use detected pixel data to provide a video stream to one or more conference participants. For example, a video processing engine can use detected pixels associated with a defined region of interest (ROI) when allocating a greater proportion or amount of available bits to process the detected pixel data to produce a video stream. The detector can be included in a camera or integrated into a video conferencing or computing device and used to output a signal associated with ROI pixel data that can be communicated to other components for processing and/or display. The detector can also be configured with augmentation functionality, which can be used to determine whether certain pixel data merits particular (e.g., more, less, none, etc.) processing operations when providing a video stream to one or more conferencing participants. According to various embodiments, hardware, memory, and/or other processing resources can be dedicated to the processing of pixel data associated with detection and/or augmentation operations.

In an embodiment, a video conferencing device detector can include augmentation functionality that can be used to filter aspects of a captured signal associated with ROI pixels. The detector can use the augmentation functionality to enhance additional features of a video scene in producing a video stream to one or more conference participants. For example, a video conferencing device can use the detector's augmentation functionality to enhance participant features, such as hair, head shape, teeth, nose, eye brow(s), lip(s), moustache, beard, glasses, nose, eye(s), ear(s), scar(s), etc., in providing a video stream.

In one embodiment, a video conferencing device includes a detector having detection and augmentation features that can be used when providing a video stream to one or more conference participants, but is not so limited. The video conferencing device can use the detector to detect and/or augment pixel data of a video frame. The detected and/or augmented pixel data can be used when transmitting a video stream to one or more conference participants. The video conferencing device can use features of the detector to provide a video stream which includes pixel data associated with a region of interest.

In another embodiment, a detecting application having detection and augmentation functionality, which includes executable instructions, can be used in conjunction with components of a video conferencing system to provide a video stream to one or more conference participants, but is not so limited. For example, a video camera or other capture device can use the detection application to detect and/or augment pixel data of a video frame. The detected and/or augmented pixel data can be used to transmit a video stream to one or more conference participants. Video conferencing devices, cameras, and other devices/systems can use the detection and augmentation functionality of an implemented detecting application to efficiently distribute processing operations to pixel data associated with a region of interest.

While various embodiments describe components and functionality associated with video conferencing systems, the embodiments are not so limited and the principles and techniques described herein can be applied to other interactive systems. Network-based conferences combining various forms of communication such as audio, video, instant messaging, application sharing, and data sharing also may be facilitated using principles described herein. Other embodiments are available.

Figure 1:
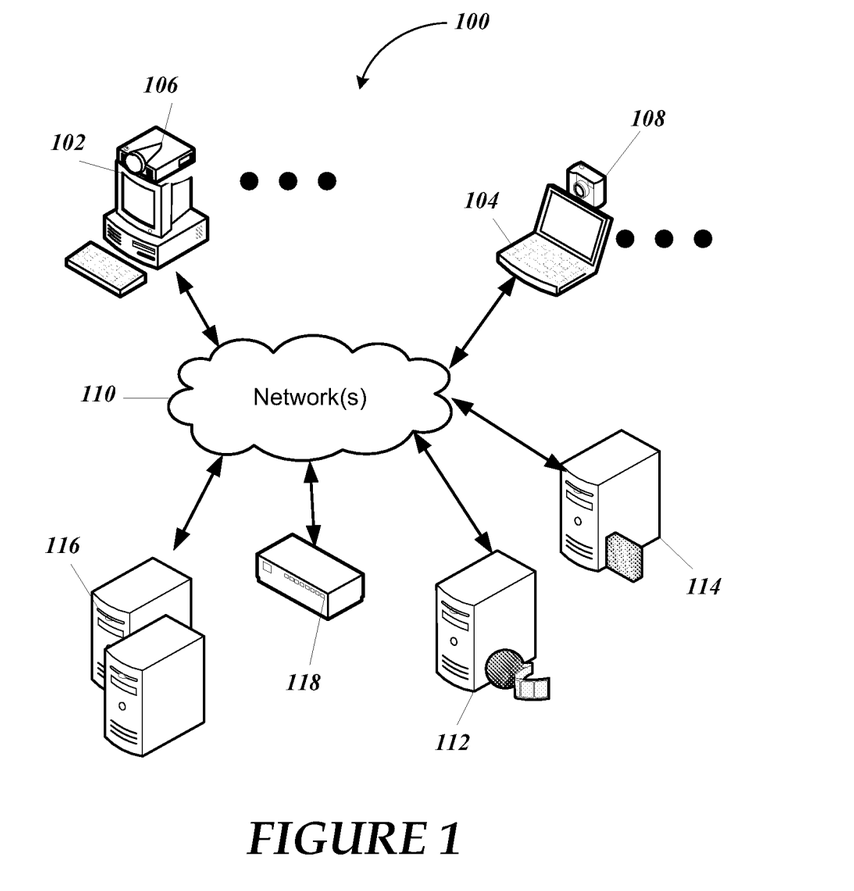
FIG. 1 is a diagram illustrating an exemplary video conferencing system.

FIG. 1 is a diagram depicting an exemplary video conferencing system 100. The video conferencing system includes a network (e.g., network 110) or networks enabling a number of participants with audio/video transmission and reception capability to communicate with one another. Each participant computing device 102, 104 can include any computing device with audio/video capability such as a desktop, laptop computer, or other computing/communication device having a camera, microphone, speaker, and/or video conferencing equipment.

As shown in FIG. 1, device 102 includes a camera 106 and device 104 also includes a camera 108. Cameras 106, 108 and other capture devices/systems can be used to provide video and other signals that can be used as part of an interactive video teleconference. For example, a camera can be used to capture actions of video conference participants at a designated frame rate and communicated to shared memory in a red-green-blue (RGB) or some other pixel format. Cameras 106, 108 can be separate components or integrated with device 102 and/or device 104. For example, a camera can be built into a computing/communication device or coupled to such a device using a coupling means (e.g., Universal Serial Bus (USB), Peripheral Component Interface (PCI), etc.)

Correspondingly, the video conferencing system 100 can include computing/communication devices having integrated cameras and associated video processing features. Moreover, video conferencing system 100 can include a plurality of computing/communication devices and associated cameras. As described below, the system 100 can also include one or more detectors associated with one or more of the participant devices 102 and/or 104 that can be used to provide a detected signal associated with ROI features. ROI can be defined as a segment of an image or video where an object of interest is or pixels of interest are located.

In an embodiment, ROI can be defined as captured pixels having color(s) similar to that of a skin tone. As described below, a video conferencing device can determine whether a majority of pixels associated with a video frame fall within the ROI, on a delineated boundary, and/or outside the ROI. In one embodiment, a captured pixel can be flagged with a value based in part on whether a pixel is outside of the ROI, on a ROI boundary, and/or within the ROI. For example, the detector can operate to flag an associated pixel for inclusion/exclusion based in part on the ROI assessment. The video conferencing device can operate faster and more efficiently since processing bandwidth can be redistributed to ROI and other pixels, while excluded pixels may not be communicated for further processing and/or weighted differently to control processing bandwidth and/or bit distributions.

In test cases, approximately ⅔ of certain video scenes may include background pixels which may be excluded from codec processing operations. Correspondingly, the detected signals associated with pixel inclusions can be communicated to one or more components of a video processing pipeline for further processing and use in displaying a video stream to video conferencing participants. For example, the detector can be included in a camera or integrated into a video conferencing or computing device to produce an output signal associated with a ROI that can be communicated to encoding and decoding components for further processing and display on an associated display.

With continuing reference to FIG. 1, network 110 can include any communication network or combination of networks. A video conference can be facilitated by a single device/program or by a combination of devices and programs. For example, audio/video server 112, firewall server 114, and/or mediation servers 116 can be included and used for different aspects of a conference, such as storage and processing of audio/video files, security, and/or interconnection of various networks for seamless communication. Any of these example tasks and others may be performed by software, hardware, and/or a combination of hardware and software. Additionally, functionality of one or more servers can be further combined to reduce the number of components.

With continuing reference to FIG. 1, and as further example, a Multipoint Control Unit (MCU) 118 can be used as a primary facilitator of a video conference in coordination with one or more of other components, devices, and/or systems. MCU 118 may use various protocols such as Internet Protocol (IP), and be structured as software program(s), hardware, or some combination thereof. MCU 118 can be implemented as a stand-alone hardware device, or embedded into dedicated conferencing devices (e.g., audio/video server 112, mediation servers 116, etc.). Additionally, MCU 118 can be implemented as a "decentralized multipoint", where each station in a multipoint call exchanges video and audio directly with the other stations with no central manager.

Figure 2A:
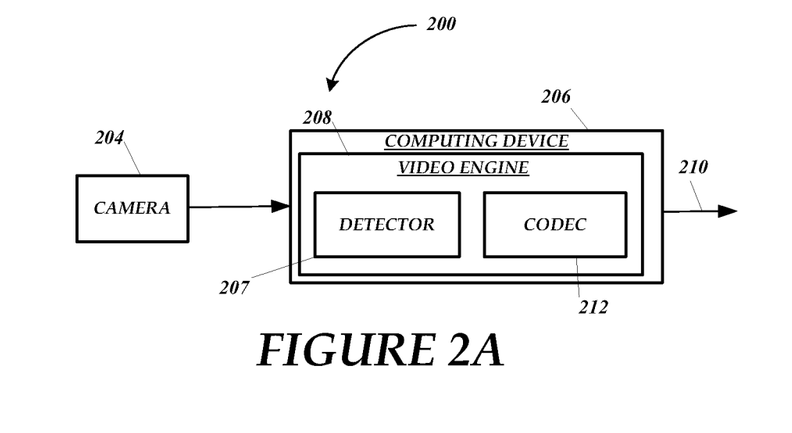
FIGS. 2A and 2B are block diagrams of exemplary video conferencing components associated with a video conferencing system.
Figure 2B:
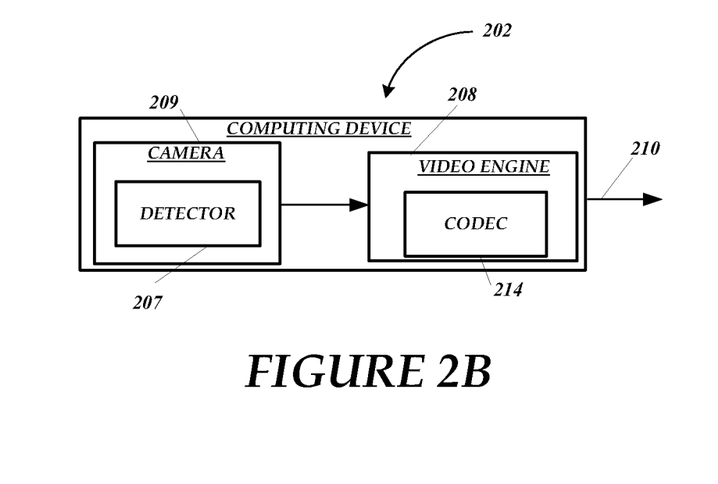

FIGS. 2A and 2B illustrate exemplary video conferencing devices 200 and 202, and associated components that can be used in a video conferencing system, such as video conferencing system 100. As shown in FIG. 2A, video conferencing device 200 includes a camera 204 in communication with computing device 206, such as a laptop, desktop, handheld, or other computing device. For example, a video camera or other optical device can be wirelessly coupled or directly wired to the computing device 206 and used to capture participant interactions. As described above, video conferencing device 200 can also include an integrated camera system.

Correspondingly, camera 204 is used to capture information and generate a signal that can be communicated to the detector 207 which can operate to generate a detected signal based on a number of ROI parameters. The detected signal can be communicated to one or more other components of a video engine 208 or processing pipeline for further processing and use in displaying video to conferencing participants. While a number of components are shown with the video engine 208, the video engine can include additional components and other functionality. For example, the video engine 208 can include one or more: preprocessing components, range compression components, motion estimation components, transform/inverse transform components, quantization/de-quantization components, deblocking components, reference picture components, prediction components, and/or variable-length coding components.

As shown in FIG. 2A, the detector 207 is included with the computing device 206. Alternatively, as shown in FIG. 2B, a video conferencing device 202 includes a camera 209 that can be configured to include the detector 207 (e.g., firmware, software application, hardware and software, etc.) and an implemented codec 214. The camera 209 can also include one or more components of the video engine 208 or additional components according to a particular implementation. Moreover, the video conferencing device 202 can include additional components and other configurations. In one embodiment, the video engine 208 can include a signal processing pipeline having encoding, decoding, and/or other components that can operate to process the detected signal to provide a video and/or audio stream which can be communicated to associated components (e.g., display, speakers, etc.) of a video conferencing system. For example, the video engine 208 can include functionality to use buffer management techniques, estimated distortion heuristics, quality impact, inter/intra prediction optimizations, etc. to distribute a bandwidth budget efficiently across different macro blocks (MBs) or other pixel distributions to provide a video stream 210.

As shown in the example of FIG. 2A, the video engine 208 includes a codec 212 that can be used to process the detected signal output by the detector 207 to provide a video stream 210 for display. The detected signal and/or video stream can also be stored for subsequent use and/or further processing. The codec 212 includes encoding and decoding functionality, including quantization features for use in providing the video stream for output on the display. For example, codec 212 or codec 214 can be of the VC-1 variety, wherein encoding/decoding operations are implemented in the frequency domain. The VC-1 codec is a popular codec that includes coding functionality for progressive encoding and interlaced video sequences. The video stream 210 can be displayed on a local display and/or a remote display. A display can also be a separate component or integrated with video conferencing device 200.

As described briefly above, the detector 207 can be configured to use ROI features and/or parameters to provide a detected signal to one or more components of the video conferencing devices 200, 202 as part of providing a video stream to one or more video conferencing participants. The detector 207 can be configured to use a semantic analysis of a captured scene, including ROI parameters and other features relevant to a captured scene, as part of providing a video stream to one or more video conferencing participants. Many current video conferencing systems use a generic methodology driven by estimating communications channel distortion and reverse engineering the estimation into the bit/bandwidth distribution across various macro blocks.

In contrast, the detector 207 can use distinguishing features of video content, including distinguishing participant features, associated with a video conference environment to provide a detected signal as part of providing a video stream for viewing and/or storing. Accordingly, the detector 207 can be used to enhance participant details as part of producing a video stream using one or more features of the video conferencing device 200. For example, the detector 207 can use motion vector distribution profiles, content pattern characteristics (e.g., human subject is typically present), and/or varying foreground/background importance factors to provide a detected signal.

In various embodiments, the components of a video conferencing system can use features of the detector 207 to detect and use one or more of: skin data (e.g., tone, color, shape, etc.) based in part on one of color and/or luminance conditions; human features and other characteristic data based in part on neighboring or adjacent macroblock and other information; and/or a designated ROI to redistribute or reallocate a bandwidth budget, communication operations, and/or other video processing operations to one or more components of the video conferencing system as part of increasing the perceived quality of a human participant.

In an embodiment, the detector 207 can be configured with a ROI based algorithm that can be used to process ROI features corresponding to a semantic analysis of video content and relevance to the video conferencing environment experienced by a participant. For example, the ROI based algorithm can be used to detect pixels associated with a ROI based in part on one or more equations defining a region of a red-green-blue (RGB) space or pixel architecture. In one embodiment, the ROI based algorithm can be used to: detect human flesh tones/regions in a video scene; make corrections or adjust detection parameters to encompass a portion or all of the variability of skin tones; augment a detection region or area to include facial and other features (e.g., head, lip(s), moustache, beard, glasses, nose, eye(s), ear(s), scar(s), etc.); and/or change or reallocate a bit distribution pattern associated with a video codec to provide more of a bandwidth budget to human participants and less of the bandwidth budget to aspects of a surrounding scene or environment.

Figure 3:
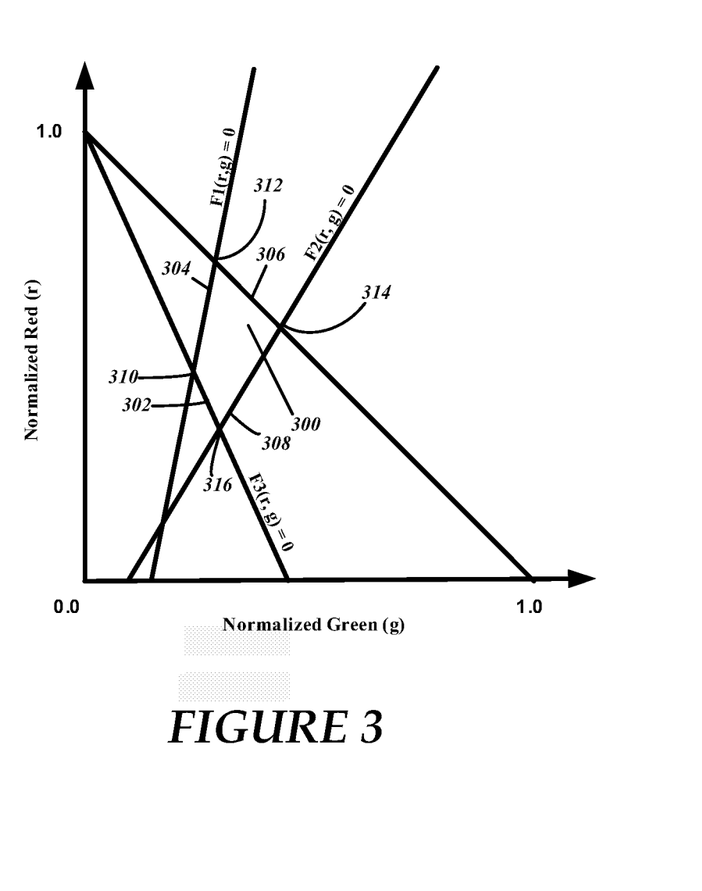
FIG. 3 is a graphical example which illustrates a defined detection region for a ROI based algorithm.

FIG. 3 is a graphical example which illustrates a defined detection region for a ROI based algorithm. In an embodiment, a video conferencing device can include a detector that uses a ROI based algorithm tailored to the detection region shown in FIG. 3. The video conferencing device can use a defined ROI, such as ROI 300 which can be defined by an intersection of a number of boundaries for example, to provide a filtered signal comprising a number of pixel parameters and other information for further processing by one or more other components of the video conferencing device. For example, ROI 300 can be used to detect or filter a color space associated with defined skin tones in a video frame that can be further processed in providing a video stream to one or more conference participants.

According to one embodiment, a detection region defined by a number of designated boundaries can be used to focus on and enhance participant detail in a video scene, as described below. As shown in FIG. 3, the boundaries determine a certain degree of each color to be associated with ROI 300. For example, an associated detector (whether integrated in a camera or a computing device of a video conference device) can be used to detect pixels associated with a defined ROI and provide a detected signal to a codec or other video processing components for further processing. The detected signal can be used by a codec or other video processing component to provide an enhanced signal without necessarily having to manipulate the functionality of the codec. Correspondingly, a greater number of processing bits can be allocated to the pixels associated with the ROI when producing a video stream for communicating and/or display.

In an embodiment, a video conferencing device can include a detector to detect pixel data associated with ROI 300 of a red-green-blue (RGB) space or pixel architecture based in part on one or more equations, functions, or other pixel-based parameters. As an example shown in FIG. 3, the equations ($F1(r, g)=0$, $F2(r, g)=0$, and $F3(r, g)=0$) define a number of boundaries 302, 304, 306, and 308 and intersection points 310, 312, 314, and 316. For example, boundary 302 can be defined by the equation $a1*r+a2*g+a3>0$ (where g is a green pixel value, r is a red pixel value, and a1-a3 are constants), boundary 304 can be defined by the equation $b1*r+b2*g+b3>0$ (where b1-b3 are constants), and boundary 306 can be defined by the equation $c1*r+c2*g+c3>0$ (where c1-c3 are constants). The equations or functions defining boundaries of a ROI can be linear, non-linear, or some combination thereof. Moreover, a defined ROI can include more or fewer boundaries and/or intersection points.

As another example, an equation corresponding to: boundary 302 can be implemented as $9*r+20*g-9>0$; boundary 304 can be implemented as $(-1*r)+5*g-0.75>0$; boundary 306 can be implemented as $r+g<1.00$; and/or, boundary 308 can be implemented as $3*r-5*g+0.50>0$, wherein r corresponds to a red pixel value associated with the normalized red axis (e.g., $r=R/(R+G+B)$) and g corresponds to a green pixel value associated with the normalized green axis (e.g., $g=G/(R+G+B)$). A pixel luminance value can also be used to determine excessive saturation (e.g., $32 \leq y \leq 200$, wherein y corresponds to a luminance value).

The detector can use pixel values associated with a captured signal in conjunction with a ROI algorithm, defined in part by the equations of FIG. 3, to detect and provide ROI pixels. The detector can use ROI pixels to generate a detected or filtered signal, having additional information, for further processing. For example, the detector can provide a detected signal that includes one or more flags associated with the ROI pixel data that can be communicated to a quantization component (e.g., included with an encoder) to further process and quantize the pixel data, including the ROI pixel data.

Figure 4:
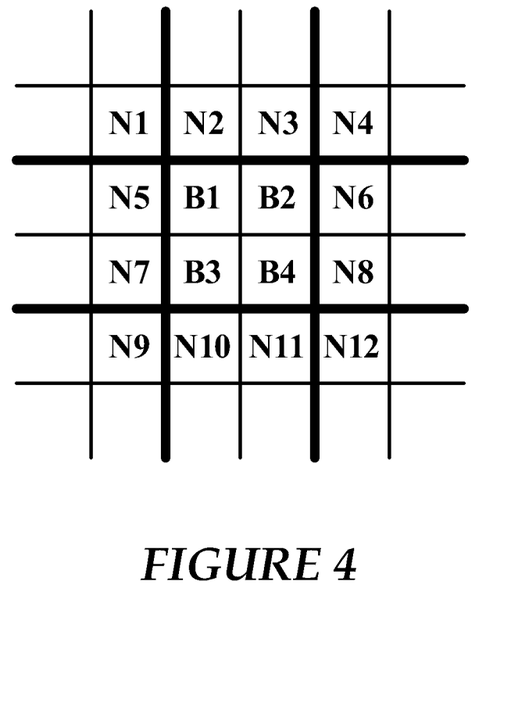
FIG. 4 is a graphical illustration of exemplary pixel data.

FIG. 4 is a graphical illustration of exemplary pixel data used by a detector in implementing augmentation functionality. For example, the augmentation functionality can be used to analyze aspects of the macroblock in determining whether to flag additional pixels for specific quantization operations associated with a captured signal. In various embodiments, a detector can use macroblock and/or other pixel parameters to determine whether to include additional pixel data associated with a ROI pixel or group of pixels, such as a detected augmentation feature. The detector can be configured to focus on regions or areas which are surrounded by or distinctly associated with a detected skin region or some other region or pixel association. The detector can use the augmentation functionality to mark or flag a pixel as a pixel of interest (POI) or a group of pixels as POIs since one or more ROI pixels are associated with a potential POI or group of POIs (e.g., pixels N1-N12 surrounding pixels B1-B4).

As shown in the example of FIG. 4, the detector is using a 4×4 macroblock (MB) that includes 4 pixel representations (B1-B4), wherein each pixel of the pixel representations can include a color value, opacity value, and/or other values/parameters as part of an augmentation operation. While a 4×4 MB is depicted, the detector and other components of a video conferencing system can use other MB sizes and/or other pixel representations (e.g., 3-block dilation for 720 p, 2-block dilation for VGA, 1-block dilation for CIF, etc.). The 4 pixel representations are surrounded by 12 other pixel representations (N1-N12). For example, the detector can augment pixel data as being associated with human skin if at least one interior block is detected as skin and/or at least one neighboring block is detected as skin.

In an embodiment, the detector can use captured pixel data to determine whether a pixel or group of pixels should be processed further based in part on other POIs associated with an augmented detection region or area. As shown in the example of FIG. 4, an augmented detection region of a 16×16 pixel macroblock includes pixels N1-N12 which has been determined according to a defined detection rule. In one embodiment, an augmented detection region or area can be determined based in part on a pixel-based inclusion rule associated with detected pixels and a ROI. For example, a detection region can be augmented to include additional pixel data if the detector detects a certain percentage (e.g., greater than or equal to 50%, greater than or equal to 75%, etc.) of pixels or samples as falling within a defined ROI.

According to the example of FIG. 4, each pixel of B1-B4 was not initially flagged by the detector as a pixel of interest (POI) since they did not pass a threshold ROI determination. However, the detector has determined that pixels N1-N12 are associated with human skin, and since pixels N1-N12 surround pixels B1-B4, the detector can use its augmentation functionality to augment and flag pixels B1-B4 as POIs for further processing and/or specific quantization operations. For example, the detector has determined that pixels B1-B4 are associated with human skin or a human feature even though pixels B1-B4 may be white (e.g., an eye, tooth, etc.).

Additionally, in making an augmentation determination, the detector can prioritize one or more POIs and/or one or more ROI pixels based in part on an association between a ROI pixel (or group of POs) and a potential POI. For example, it is likely that an important feature is associated with pixel data when a pixel or group of pixels are surrounded by or substantially surrounded by ROI pixels, but may not have been initially marked or flagged as a ROI pixel or pixels. Moreover, pixels N1, N4, N9, and N12 can be weighted differently (higher or lower priority) than pixels, N2, N3, N5, N6, N7, N8, N10, and N11 since pixels N1, N4, N9, and N12 are diagonally related (e.g., hair, eyebrow, etc.) to pixels B1-B4 being considered for further processing.

In an alternative embodiment, the detector can also operate to unmark or adjust a weighting factor of one or more pixels, if the detector determines as part of an augmentation determination that one or more pixels should not be processed (or processed at a different quantization) due in part to the relationship to ROI pixels. For example, certain areas (e.g., hair, glasses, facial wrinkles, and/or other details, etc.) associated with a defined ROI can be considered as a part of the ROI even if the color components are not identical or substantially similar to colors of the ROI. That is, a detection algorithm can be configured to such that detected information can be flagged or considered as relevant and excluded or flagged as being less or not relevant to a defined or augmented ROI.

Upon considering a video frame, the detector can communicate the flagged POIs and ROI pixels to other components (e.g., a codec) of a video conferencing device. For example, an ROI pixel may be flagged with a "1" and a POI may be flagged with a "0". Quantization operations can use the flagged pixel data in processing the pixel data further. For example, a codec can use existing quantization functionality to quantize pixels flagged with a "1", while pixels marked with a zero may not be quantized or are to be quantized using an increasing quantization factor corresponding to less important pixel data within the video scene.

Figure 5:
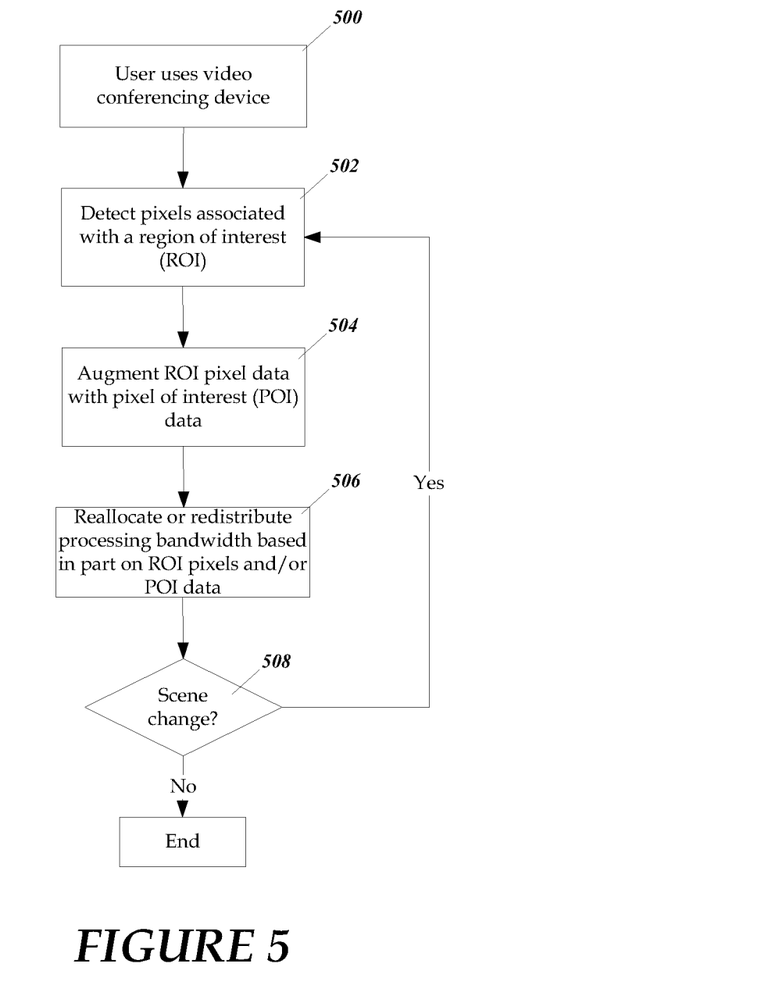
FIG. 5 is a flow diagram illustrating an exemplary process of providing a video stream.

FIG. 5 is a flow diagram illustrating an exemplary process of providing a video stream. As an example, the process can be used to provide a video stream to one or more video conferencing participants using a ROI and/or augmentation features associated with a video conference device. For example, each participant can use a video conferencing device (e.g., device 200, 202) that includes a detector that can operate to detect pixels associated with a ROI for use in providing a video stream. At 500, a user uses a video conferencing device to participate in a video conference. For example, a user can position him/her self in front of an associated camera and begin interacting with other conference participants who are also participating in a video conference.

At 502, the detector of the video conferencing device can operate to detect pixels of a defined ROI for each participant or video scene. For example, the detector can operate to detect human flesh tone regions in a video scene using color and/or luminance conditions associated with a video conferencing environment. In one embodiment, a video conferencing device can use a detector and associated ROI algorithm to detect human skin features which correspond to the ROI 300 defined by the boundaries 302-308 of FIG. 3. The ROI algorithm can also be configured to correct or update a ROI to encompass a variability and/or a range of skin tones. As an example, the ROI algorithm can be used to detect dark skin tones, light skin tones, mixed skin tones, etc.

At 504, the detector and/or other components of the video conferencing device can be used to augment pixel data associated with a ROI with additional data in providing an augmented pixel data for use in providing a video scene. For example, the detector can be configured with augmentation functionality which can be used to detect other human features using neighborhood or adjacent MB information. At 506, one or more components of the video conferencing device can use the augmented pixel data to redistribute or reallocate a bit distribution and/or bandwidth to focus on the augmented pixel data when providing the video stream. Since the detector can operate to provide a frequency domain signal, time domain prediction issues and exacerbations may be avoided.

Moreover, a bandwidth budget can be efficiently distributed to process aspects of the video scene using the augmented and/or marked pixel data provided by the detector (e.g., using a VC-1 or other frequency domain codec). If the video scene changes or one or more components are reconfigured or otherwise changed at 508, the flow returns to 502. Otherwise, the flow returns to 500. While a certain order and number of operations are described above, the order and/or number of operations and/or components can be modified and/or reconfigured according to a desired implementation. For example, operations can be selectively added, removed, rearranged, etc. according to a desired implementation. Accordingly, other embodiments are available.

The Table below highlights bandwidth savings of a video conferencing device using detection and/or augmentation functionality to provide a video stream associated with ROI pixel data. The results compare systems/devices that do not include the detection and/or augmentation functionality described above. As shown in the Table, the bandwidth savings range from about 0% to about 60% (~18% average), depending in part on the quantization parameters index (PQINDEX) and the frame size captured in kilobits per second. While PQINDEX is shown, other quantization parameter (QP) factors may be used. For example, a QP factor ranging from about 0.5 to about 6 can be used with a VC-1 type codec. The range can be tailored according to a particular codec or other quantizing component. PQINDEX's of 4 (4 uniform), 8 (8 uniform), 12 (9 non-uniform), and 16 (13 non-uniform) are used in the Table.

TABLE

| Input | | Without ROI | With ROI | |
|---|---|---|---|---|
| File | PQINDEX | Size (kbps) | Size (kbps) | Savings |
| L9000a.avi | 4 | 556 | 237 | 58% |
| L9000a.avi | 8 | 243 | 142 | 42% |
| L9000a.avi | 12 | 97 | 61 | 37% |
| L9000a.avi | 16 | 54 | 42 | 23% |
| L9000b.avi | 4 | 371 | 326 | 12% |
| L9000b.avi | 8 | 173 | 162 | 6% |
| L9000b.avi | 12 | 96 | 92 | 3% |
| L9000b.avi | 16 | 69 | 69 | 0% |
| L9000c.avi | 4 | 628 | 553 | 12% |
| L9000c.avi | 8 | 311 | 289 | 7% |
| L9000c.avi | 12 | 175 | 168 | 4% |
| L9000c.avi | 16 | 126 | 125 | 1% |
| CIF.avi | 4 | 305 | 200 | 35% |
| CIF.avi | 8 | 137 | 109 | 21% |
| CIF.avi | 12 | 76 | 64 | 16% |
| CIF.avi | 16 | 54 | 50 | 7% |

Taking a more detailed look, a couple conclusions can be seen from the results. First, different videos show vastly different amounts of savings. This is due in part to the nature of the videos. L9000a included a conversing human head contrasted against a window background and is somewhat of an ideal scenario. L9000b and L9000c are taken perpendicular to a window, under fluorescent lighting and with yellow toned walls and furniture. CIF is taken using a device with mixed amount of sun and fluorescent light.

Figure 6:
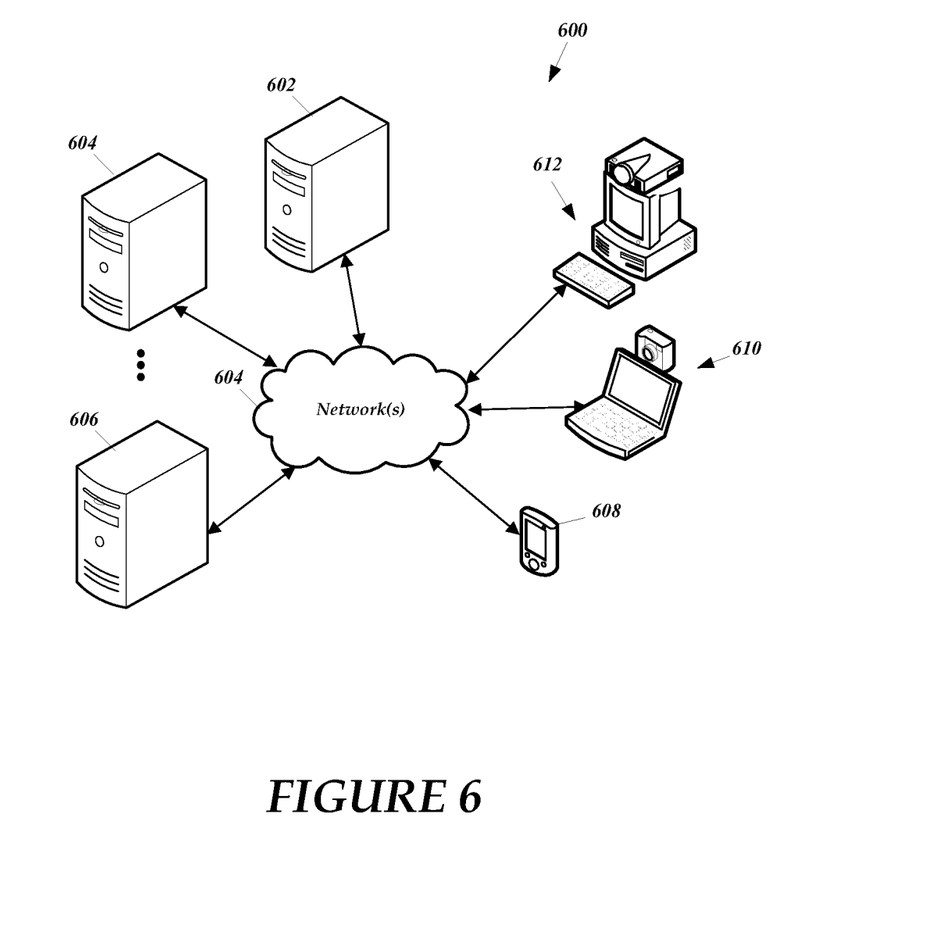
FIG. 6 illustrates an exemplary networked environment.

FIG. 6 is an example networked environment 600, where various embodiments may be implemented. Detection and augmentation operations can be implemented in such a networked environment 600. As shown in FIG. 6, the networked environment 600 can include a topology of servers (e.g., web server 602, mediation server 604, collaboration server 606, etc.), clients, devices, Internet service providers, communication media, and/or other network/communication functionality. The networked environment 600 can also include a static or dynamic topology. Video conferencing devices (e.g., smart phone 608, laptop 610, desktop 612, etc.) can be configured with a detector to provide a video stream to one or more components of the networked environment 600. For example, a user can use a camera which includes a detector having detection and/or augmentation features that can be used to provide the video stream to one or more conferencing participants.

The networked environment 600 can include a secure network such as an enterprise network, an unsecure network such as a wireless open network, the Internet, or some other network or combination of networks. By way of example, and not limitation, the networked environment 600 can include wired media such as a wired network or direct-wired connection, and/or wireless media such as acoustic, radio frequency (RF), infrared, and/or other wireless media. Many other configurations of computing devices, applications, data sources, data distribution systems, etc. can be employed to implement browsing and other functionality. Moreover, the networked environment 600 of FIG. 6 is included for illustrative purposes. Embodiments are not limited to the example applications, modules, devices/systems, or processes described herein.

Exemplary Operating Environment

Figure 7:
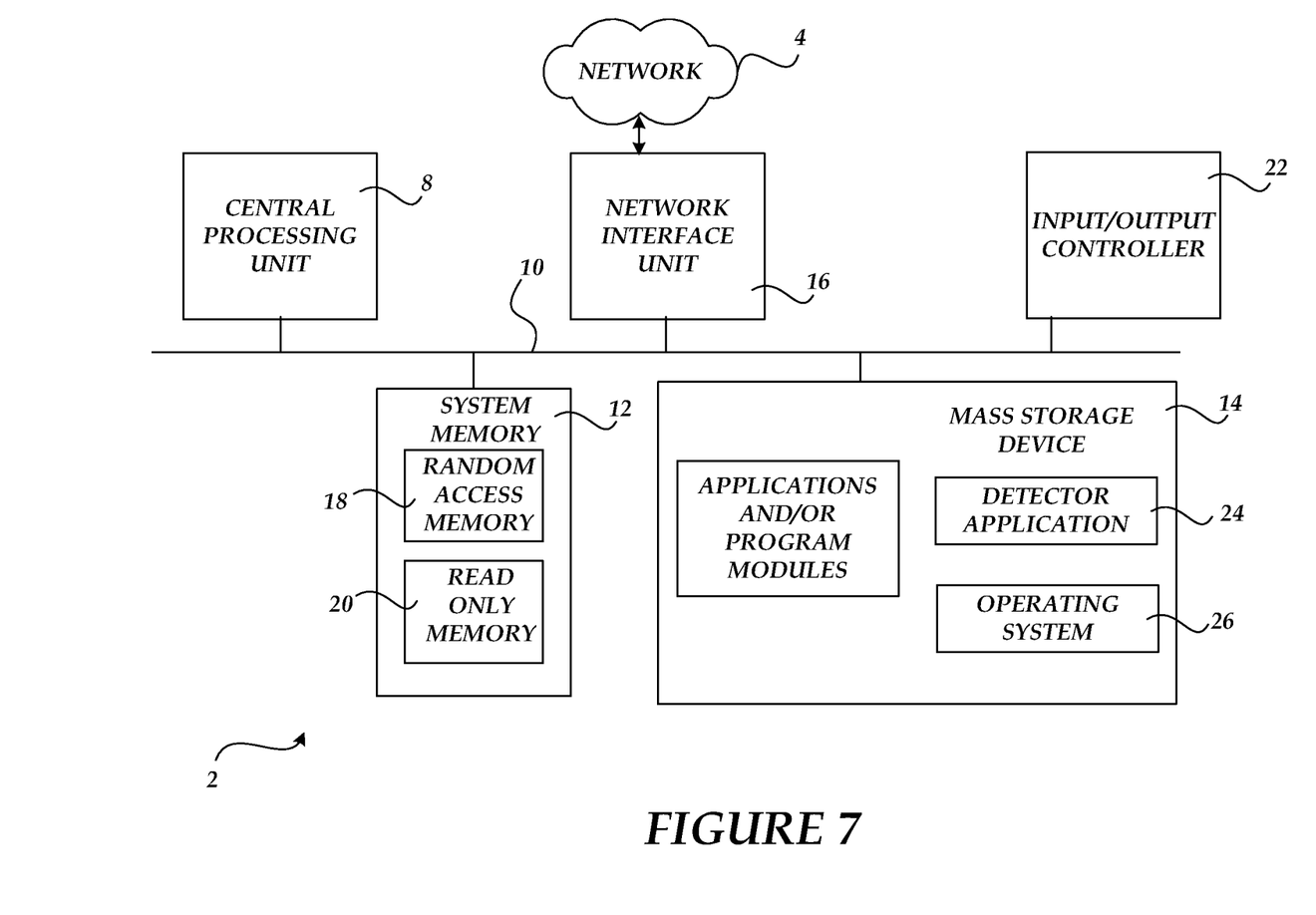
FIG. 7 is a block diagram illustrating an exemplary computing environment for implementation of various embodiments described herein.

Referring now to FIG. 7, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including handheld devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 7, an illustrative operating environment for embodiments of the invention will be described. As shown in FIG. 7, computing device 2 comprises a general purpose desktop, laptop, handheld, tablet, or other type of computer capable of executing one or more application programs. The computing device 2 includes at least one central processing unit 8 ("CPU"), a system memory 12, including a random access memory 18 ("RAM"), a read-only memory ("ROM") 20, and a system bus 10 that couples the memory to the CPU 8. A basic input/output system containing the basic routines that help to transfer information between elements within the computer, such as during startup, is stored in the ROM 20.

The computing device 2 further includes a mass storage device 14 for storing an operating system 26, application programs, and/or other program modules. The mass storage device 14 is connected to the CPU 8 through a mass storage controller (not shown) connected to the bus 10. The mass storage device 14 and its associated computer-readable media provide non-volatile storage for the computing device 2. Although the description of computer-readable media contained herein refers to a mass storage device, such as a hard disk or CD-ROM drive, it should be appreciated by those skilled in the art that computer-readable media can be any available media that can be accessed or utilized by the computing device 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computing device 2.

According to various embodiments, the computing device 2 may operate in a networked environment using logical connections to remote computers through a network 4, such as a local network, the Internet, etc. for example. The computing device 2 may connect to the network 4 through a network interface unit 16 connected to the bus 10. It should be appreciated that the network interface unit 16 may also be utilized to connect to other types of networks and remote computing systems. The computing device 2 may also include an input/output controller 22 for receiving and processing input from a number of input types, including a keyboard, mouse, keypad, pen, stylus, finger, speech-based, and/or other means. Other input means are available including combinations of various input means. Similarly, an input/output controller 22 may provide output to a display, a printer, or other type of output device. Additionally, a touch screen or other digitized device can serve as an input and an output mechanism.

As mentioned briefly above, a number of program modules and data files may be stored in the mass storage device 14 and RAM 18 of the computing device 2, including an operating system 26 suitable for controlling the operation of a networked personal computing device, such as the WINDOWS operating systems from MICROSOFT CORPORATION of Redmond, Wash. for example. The mass storage device 14 and RAM 18 may also store one or more program modules. The mass storage device 14, or other storage, and the RAM 18 may store other application programs or modules, including detector application 24.

Components of the systems/devices described above can be implemented as part of networked, distributed, and/or other computer-implemented and communication environments. Moreover, the detection functionality can be used in conjunction with a desktop computer, laptop, smart phone, personal data assistant (PDA), ultra-mobile personal computer, and/or other computing or communication devices to provide conferencing data. Aspects of a video conferencing system can be employed in a variety of computing/communication environments. For example, a video conferencing system can include devices/systems having networking, security, and other communication components which are configured to provide communication and other functionality to other computing and/or communication devices.

While certain communication architectures are shown and described herein, other communication architectures and functionalities can be used. Additionally, functionality of various components can be also combined, further divided, expanded, etc. The various embodiments described herein can also be used with a number of applications, systems, and/or other devices. Certain components and functionalities can be implemented in hardware and/or software. While certain embodiments include software implementations, they are not so limited and also encompass hardware, or mixed hardware/software solutions. Accordingly, the embodiments and examples described herein are not intended to be limiting and other embodiments are available.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of a computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of providing a video signal comprising:
    capturing pixel data associated with a conferencing environment;
    determining whether a captured pixel is included within a defined region of interest (ROI) defined in part by a number of boundaries comprising at least three boundaries defined in part by three equations including $r+g<1$ that use red (r) pixel values associated with a normalized red axis and green (g) pixel values associated with a normalized green axis;
    designating the captured pixel as a ROI pixel if the captured pixel is included within the defined ROI; and,
    using an augmented detection region associated with the defined ROI to enhance distinguishing participant features as part of allocating more of a bandwidth budget to human participants and less of the bandwidth budget to other visual aspects of a surrounding scene of the conferencing environment.

2. The method of claim 1, further comprising defining the ROI based in part on red-green-blue (RGB) pixel parameter boundaries and quantizing the captured pixel data based in part on a pixel designation.

3. The method of claim 1, further comprising communicating the captured pixel data, including information associated with ROI pixels, for a quantization operation.

4. The method of claim 1, further comprising communicating the captured pixel data, including information associated with ROI pixels, for an encoding operation.

5. The method of claim 1, further comprising allocating processing bandwidth based in part on a pixel designation.

6. The method of claim 1, further comprising redistributing processing operations based in part on a pixel designation.

7. The method of claim 1, further comprising using the augmented detection region as part of augmenting designated ROI pixel data with additional pixel data based in part on an augmentation operation associated with a ROI pixel.

8. The method of claim 7, further comprising quantizing augmented and ROI pixel data based in part on a quantization factor.

9. The method of claim 1, further comprising quantizing the captured pixel data based in part on a flag associated with a ROI pixel.

10. The method of claim 1, further comprising flagging captured pixels with pixel values based in part on whether captured pixel parameters correspond to the ROI.

11. The method of claim 1, further comprising defining the ROI by linear boundaries, each linear boundary comprising a linear equation associated with a normalized RGB space, wherein intersections and the linear boundaries define aspects of the ROI.

12. The method of claim 1, further comprising communicating encoded pixel data associated with the ROI to one or more conference participants.

13. The method of claim 1, wherein the capturing occurs within a camera or computing device.

14. A video conference device operable to provide a video stream to one or more participants, the video conference device comprising:
   a detector operable to:
      detect if a ROI pixel is included with captured pixel data based in part on whether a captured pixel is associated with a ROI defined in part by a number of region boundaries, wherein the number of region boundaries are associated with a RGB space and comprise at least three region boundaries defined in part by three equations including $r + g < 1$ that use red (r) pixel values associated with a normalized red axis and green (g) pixel values associated with a normalized green axis;
      identify the captured pixel as the ROI pixel if the captured pixel is included within the ROI;
      use an augmented detection region associated with the ROI to enhance distinguishing participant features as part of allocating more of a bandwidth budget to human participants and less of the bandwidth budget to other visual aspects of a surrounding scene; and,
      output the pixel data based in part on an identified ROI pixel.

15. The video conference device of claim 14, further comprising a camera for capturing pixel data.

16. The video conference device of claim 14, further comprising a camera which includes the detector.

17. A video conferencing system comprising:
   a camera to capture pixel data associated with a video scene;
   a detector operable to:
      detect ROI pixel data associated with the captured pixel data if the captured pixel data includes a pixel corresponding with a ROI comprising at least three boundaries defined in part by three equations including $r + g < 1$ that use red (r) pixel values associated with a normalized red axis and green (g) pixel values associated with a normalized green axis corresponding to pixel parameters associated with human skin and a RGB space;
      flag the ROI pixel data to designate the ROI pixel data as corresponding with the ROI, wherein one or more flags can be used for additional processing operations; and,
      use an augmented detection region associated with the ROI to enhance distinguishing participant features as part of allocating more of a bandwidth budget to human participants and less of the bandwidth budget to other visual aspects of the visual scene.

18. The system of claim 17, further comprising a video engine to process the pixel data based in part on the one or more flags.

19. The system of claim 17, wherein the camera includes the detector.

20. The system of claim 17, wherein the ROI is defined as including one or more color-based boundaries.

* * * * *